United States Patent [19]

Johnston

[11] Patent Number: 4,462,600
[45] Date of Patent: Jul. 31, 1984

[54] ROTARY FLUID SEALS

[75] Inventor: David E. Johnston, Newcastle upon Tyne, England

[73] Assignee: George Angus & Company Limited, Newcastle upon Tyne, England

[21] Appl. No.: 570,270

[22] Filed: Jan. 12, 1984

[30] Foreign Application Priority Data

Jan. 19, 1983 [GB] United Kingdom ............... 8301470

[51] Int. Cl.³ .............................................. F16J 15/34
[52] U.S. Cl. :..................................... 277/25; 277/35; 277/37
[58] Field of Search ........................ 277/35, 37, 25, 84

[56] References Cited

U.S. PATENT DOCUMENTS

| 2,614,869 | 10/1952 | Smith | 277/35 |
| 2,884,267 | 4/1959 | Kosatka | 277/36 |
| 3,069,175 | 12/1962 | Skinner | 277/35 |
| 3,368,819 | 2/1968 | Otto | 277/37 |
| 3,394,939 | 7/1968 | Mastro | 277/35 |
| 4,348,031 | 9/1982 | Johnston | 277/25 |
| 4,432,557 | 2/1984 | Drucktenhergst | 277/35 |

Primary Examiner—Robert I. Smith
Attorney, Agent, or Firm—William R. Hinds

[57] ABSTRACT

A rotary fluid seal having a flexible sealing ring which floats between relatively rotatable counterface members and has contact faces which bear on the counterfaces under the influence of centrifugal force, such as forms the subject of U.S. Pat. No. 4,348,031, is provided with a rigid spring-retaining ring which permits but limits centrifugal expansion of a spring loading the contact faces against the counterfaces.

5 Claims, 2 Drawing Figures

ROTARY FLUID SEALS

This invention relates to rotary fluid seals especially oil seals for rotary shafts although the application of the invention to sealing against leakage of fluid from between relatively rotatable members in general is not excluded.

The invention provides a modification applicable to the seals which form the subject of our U.S. Pat. No. 4,348,031 and in particular of the kind illustrated by FIGS. 2 and 4 of the specification thereof in substance reproduced as FIG. 1, designated "Prior Art", of the accompanying drawings.

Figure 1:
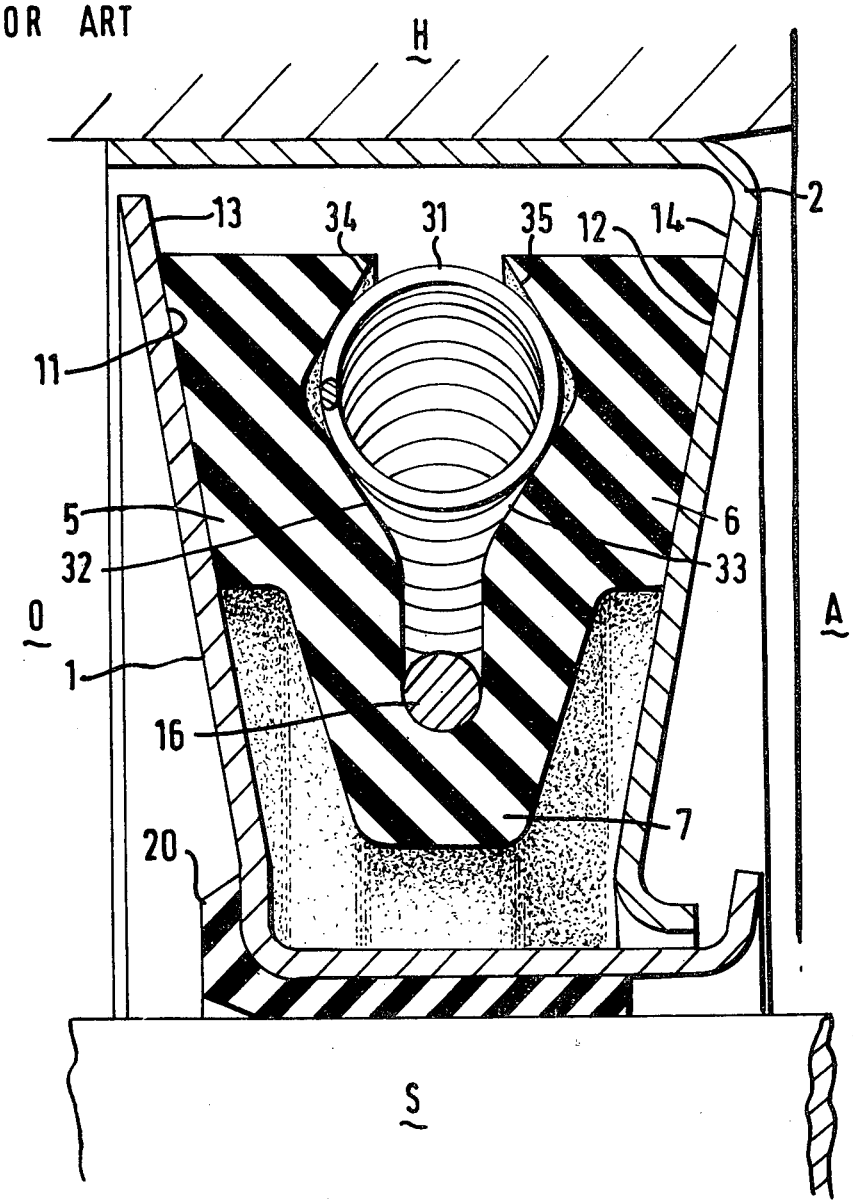

As illustrated by FIG. 1, a rotary fluid seal, for preventing leakage of fluid between two coaxial relatively rotatable members 1, 2, comprises a circular flexible sealing ring 7 freely located to float substantially coaxially between axially opposed counterfaces 13, 14 of the relatively rotatable members, the sealing ring having a pair of radially outwardly divergent, oppositely axially directed, annular sealing lips 5–6, to bear resiliently against the counterfaces respectively, so that the sealing ring is frictionally driven into rotation by one or the other of the members on relative rotation thereof. The sealing lips 5–6 each present to the respective counterface 13, 14 a frusto-conical contact face 11, 12 defined by radially inner and outer peripheral edges and the counterfaces are radially outwardly divergent and frusto-conical for face contact by the sealing lip contact faces, so that the sealing ring is substantially coaxially located by seating between the counterfaces, and the effect of centrifugal force due to rotation of the sealing ring, tending to cause the sealing lips to flex angularly outwardly towards a radial plane, is to reduce the bearing load of the contact faces on the counterfaces. The seal of FIG. 1 also has a contractile garter spring 31 acting radially, between oppositely divergent pairs of inner faces 32–33 and 34–35 of the lips 5 and 6, to urge the lips apart so as indirectly to load the contact faces 11 and 12 resiliently against the counterfaces 13 and 14.

As more fully described in the specification of our U.S. Pat. No. 4,348,031, a seal such as is shown by FIG. 1 in use is mounted fluid-tight by one casing ring 1, with an elastomeric bush 20, on a shaft S and the other casing ring 2 fluid-tight in a housing H.

The purpose of the seal is to prevent leakage of oil from the interior of the housing, called the oil-side and indicated by the reference O in the drawing, to the outside, called the air-side and shown by A in the drawing.

The seal illustrated by FIG. 1 operates in the following manner. When the shaft starts to rotate, the sealing ring 7 will tend to rotate with the counterface 13 but friction against the counterface 14 will tend to restrain rotation of the ring 7 so that the speed of rotation of the ring 7 will be less than that of the shaft. Due to rotation, the lips 5 and 6 of the ring 7 will be subject to centrifugal force the effect of which will be to cause them to tend to move angularly outwards towards radial planes away from the counterfaces 13 and 14. However, with such centrifugal-induced movement of the contact faces away from their counterfaces, the rotation imparted to the ring 7 will reduce as a result of reduction in the frictional contact. Centrifugal effect will therefore tend to diminish, allowing the contact faces to move back towards their counterfaces. The nett result is that the ring 7 will float in a condition in which the contact faces bear on their counterfaces sufficiently for the ring 7 to be entrained in rotation but, for speeds up to about 1000 RPM for a ring of 140 mm outer diameter, the speed of rotation of the ring 7 is not likely to be so high that the contact faces lose contact through centrifugal action.

Due to the fact that the ring 7 is sealing against oil leakage, there will always be an oil film between the contact faces and their counterfaces and this oil film will be maintained as a hydrodynamic seal between the opposed surfaces. It will of course be understood that reference to contact of the faces 11 and 12 against the counterfaces 13 and 14 includes the condition of nominal contact with the interposition of an oil film.

The sealing ring 7 of FIG. 1 is especially suitable for use in a seal for high speed use, for example over 1000 RPM for a sealing ring of 140 mm outer diameter. This sealing ring has a stiffening metal ring 16 in the base of its U-shape, to resist centrifugal distortion. The ring also has an axial loading garter spring 31 which tends constantly to contract resiliently so as to bear against the divergent inner faces 32 and 33 of the lips 5 and 6 but, under centrifugal force, tends to expand so as to bear against the convergent outer faces 34 and 35 of the lips 5 and 6. In either case, the effect of the spring 31 is to tend to spread the lips apart and thus to promote either a static seal or a dynamic seal of the faces 11 and 12 against their counterfaces.

The present invention provides a modified seal for high speed use, for example 3000–4000 RPM for a sealing ring of 140 mm outer diameter, it being found that at such speeds, or at lower speeds with larger diameter seals, both the sealing ring and the garter spring are liable to distortion which spoils maintenance of sealing contact between the contact faces and their counterfaces.

The present invention is directed to solving the above problem and is applied to a rotary fluid seal, for preventing leakage of fluid between two coaxial relatively rotatable members, of the kind comprising a circular flexible sealing ring freely located to float substantially coaxially between axially opposed counterfaces of the relatively rotatable members, the sealing ring having a pair of radially outwardly divergent, oppositely axially directed, sealing lips presenting annular contact faces to bear resiliently against the counterfaces respectively so that the sealing ring is frictionally driven into rotation by one or the other of the members on relative rotation thereof, and the sealing lips having between them spring means acting radially so as indirectly to load the contact faces resiliently against the counterfaces. According to the invention there is provided a rigid spring-retaining ring which permits but limits centrifugal expansion of the spring means and retains the spring means in loading relationship to the sealing lips.

In a preferred form, the spring-retaining ring is a metal or plastics flanged ring, substantially of L-section, having a substantially radial flange which rests against, but is not secured to, an opposed inner face of one sealing lip and a substantially axial but outwardly divergent, or flared, flange which surrounds the spring means, with a clearance at static or low speed conditions but at high speed is contacted by the spring means, limiting centrifugal expansion and transmitting the load thereof to the sealing lip against which its radial flange rests.

Preferably the spring means is a single contractile garter spring but other springs could be used, for example multiple springs as shown by FIG. 3 of the specification of our U.S. Pat. No. 4,348,031.

Figure 2:
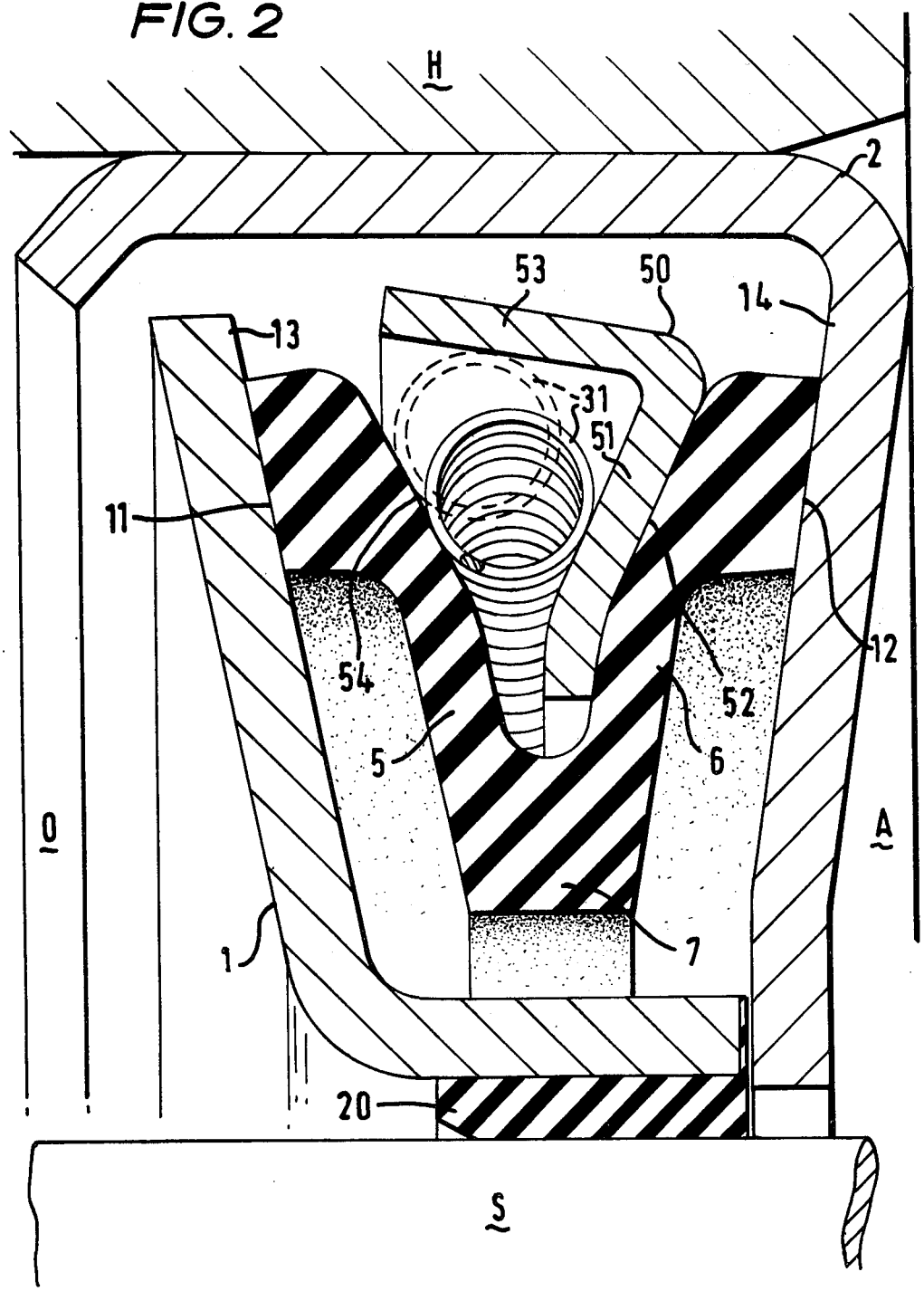

The invention is illustrated by way of example by FIG. 2 of the accompanying drawings showing, in half axial section, a seal according to the invention in position on a shaft in a housing.

The seal shown by FIG. 2 is of the same kind as the prior art seal of FIG. 1 and the same references are used for corresponding parts.

In accordance with the invention there is provided an additional element in the form of a metal or plastics flanged ring 50, rigid enough not to distort under the effect of centrifugal force at designed speeds.

The ring 50 is substantially of L-section and a radial flange 51 thereof is shaped to rest against the inner face 52 of the sealing lip 6 of the sealing ring 7. The other flange 53 of the ring 50 is substantially axial but slightly outwardly divergent, or flared.

The axial flange 53 extends almost across the space between the inner face 52 of the sealing lip 6 and the inner face 54 of the sealing lip 5 and surrounds the contractile garter spring 31 with a clearance at static and low-speed conditions. The spring 31, as shown in full lines, then bears between the inner face 54 of the lip 5 and the radial flange 51 of the ring 50 and, by its contraction, tends to thrust the lips 5 and 6 apart and load their contact faces 11 and 12 against the counterfaces 13 and 14.

At higher speeds, centrifugal force tends to expand the spring 31, overcoming its contractile force and reducing the direct load of the spring on the lip face 54 and flange 51. Once the contractile force of the spring is overcome it tends to expand rapidly but this is limited by the spring, having reached the position shown by broken lines, encountering the axial flange 53 of the ring 50. In this condition the spring bears between the inner face 54 of the lip 5 and the divergent flange 53 through which, under centrifugal force, it exerts a load on the radial flange 51 and thus on the lip 6.

The ring 50 also serves another purpose. The radial flange 51 being shaped to fit and covering a major part of the face 52 of the lip 6 opposes expansion and distortion of the lip 6 under centrifugal force and thereby stabilises the sealing ring 7 without preventing flexing of the lip 6. Distortion of the flexible material, usually synthetic rubber, of the ring 7 would tend to be gradual and progressive with increase of speed and the radial flange 51 of the ring 50, being in constant contact with the face 52, serves as a constant stabilising support.

Although the contact faces 11 and 12 and inner faces 52 and 54 of the lips 5 and 6 and the counterfaces 13 and 14 of the casing rings 1 and 2 are shown as of substantially symmetrical, equi-angular frustoconical shape, this is not essential. Angles at one side may be different from corresponding angles at the other side, in order to achieve balance or special effects at designed speeds.

I claim:

1. A rotary fluid seal, for preventing leakage of fluid between two coaxial relatively rotatable members, comprising a circular flexible sealing ring freely located to float substantially coaxially between axially opposed counterfaces of said relatively rotable members, said sealing ring having a pair of radially outwardly divergent, oppositely axially directed, sealing lips presenting annular contact faces to bear resiliently against said counterfaces respectively, said sealing lips having between them spring means acting radially so as indirectly to load said contact faces resiliently against said counterfaces, and rigid spring-retaining ring means which permits but limits centrifugal expansion of said spring means and retains said spring means in loading relationship to said sealing lips.

2. A seal according to claim 1 in which said spring-retaining ring means is a flanged ring, substantially of L-section, having a substantially radial flange which rests against, but is not secured to, an opposed inner face of one said sealing lip and a substantially axial but outwardly divergent flange which surrounds said spring means, with a clearance at static or low speed conditions, but at high speed is contacted by said spring means, limiting centrifugal expansion and transmitting the load thereof to said one sealing lip against which its radial flange rests.

3. A seal according to claim 2, in which said spring means is a contractile garter spring located between said radial flange of said spring-retaining ring and the opposed inner face of the other said sealing lip.

4. A seal according to claim 2, in which said radial flange of said spring-retaining ring is shaped to fit and covers a major part of the inner face of said one sealing lip.

5. A seal according to claim 1, in which said relatively rotatable members are casing rings enclosing said sealing ring, one casing ring having an elastomeric bush, for mounting on a shaft, and the other casing ring being adapted to fit fluid-tight in a housing.

* * * * *